United States Patent [19]
Jackson

[11] Patent Number: 6,076,789
[45] Date of Patent: Jun. 20, 2000

[54] INSTRUMENT HOLSTER AND KIT

[76] Inventor: Barry D. Jackson, 5708 Tahama St., Sacramento, Calif. 95841

[21] Appl. No.: 09/111,623

[22] Filed: Jul. 7, 1998

[51] Int. Cl.[7] .................................................. A44B 13/00
[52] U.S. Cl. ................................... 248/205.2; 224/901.4; 248/682
[58] Field of Search ............................ 248/205.2, 682, 248/693, 74.3; 224/148.6, 240, 901.4; 24/16 PB, 17 AP

[56] References Cited

U.S. PATENT DOCUMENTS

| | | |
|---|---|---|
| D. 203,101 | 12/1965 | Holder . |
| D. 280,863 | 10/1985 | Leath . |
| D. 297,683 | 9/1988 | Beauchan . |
| D. 316,999 | 5/1991 | Sarff . |
| 4,572,415 | 2/1986 | Fehr . |
| 4,757,927 | 7/1988 | Rutty . |
| 4,759,963 | 7/1988 | Uso, Jr. et al. .................. 248/205.2 X |
| 4,771,927 | 9/1988 | Ventura . |
| 4,896,465 | 1/1990 | Rhodes et al. ................... 248/205.2 X |
| 5,065,964 | 11/1991 | Polak ............................... 248/205.2 X |
| 5,174,483 | 12/1992 | Moore, IV . |
| 5,443,192 | 8/1995 | Hodges . |
| 5,503,316 | 4/1996 | Stewart ............................ 224/901.4 X |
| 5,511,704 | 4/1996 | Linderer . |

*Primary Examiner*—Ramon O. Ramirez
*Attorney, Agent, or Firm*—Heisler & Associates

[57] ABSTRACT

This is a holster for suspending an instrument such as a portable telephone from the waistband belt of a user, or from another fixed object. The holster includes a flexible body member with a cinching strap projecting from one end thereof. One face of the cinching strap is covered with one patch of a mating pair of fabric fasteners. A cinching loop is affixed to the body, about a third of the way along its midlength and in transverse relation to the longitudinal axis thereof. A patch of mating fabric complementary to that on the cinching strap is disposed on the same face of the body as the cinching loop, but at the opposite end of the body from which the cinching strap projects. The opposed face of the body bears an instrument attachment loop. The cinching strap is adapted to be wrapped around a waistband belt or other fixed object, threaded through the cinching loop, and drawn tight, thus cinching the cinching strap constrictively around the waistband belt. The mating fabric on the cinching strap and on the body opposite the cinching loop are then engaged by pressing them together, thus completing affixation of the holster to the waistband belt. The projecting spring clip of an instrument can then be slidingly engaged with the instrument attachment loop. Once the holster is so engaged with the waistband belt, and the instrument is so engaged with the holster, it is unlikely that, by mistake or without authorization, the instrument will be easily separated from the holster or the holster will be separated from the waistband belt.

20 Claims, 10 Drawing Sheets

FIG. — 4

INSTRUMENT HOLSTER AND KIT

BACKGROUND OF THE INVENTION

1. Field of the Invention

The present invention relates generally to holsters for securely suspending items that need to be kept close at hand, and more specifically to holsters for suspending instruments such as portable telephones, pagers, personal stereos, walkie-talkies, calculators and the like.

2. Description of the Related Art

Portable electronic instruments such as cellular and PCS telephones, pagers, radios and the like now play important roles in the daily lives of a large percentage of the population. These and a variety of other instruments such as electronic calculators and various mechanical and electronic tools and devices need to be kept close at hand during work and recreation. However, it is often a challenge to keep such instruments within reach, while keeping them from being lost, stolen or broken.

Portable cellular telephones provide a good example. They are used throughout the day for many purposes, including business and leisure communication, and for safety. Users often carry their telephones on their persons for extended periods of time. Although some cellular telephones are quite small, most are not comfortably carried in a pocket. And, they often take up too much room in, or are difficult to retrieve from, an already cluttered purse or vehicle glove box.

For convenience, several holster constructions have been proposed which allow users to carry idle telephones hands-free. Holsters typically attach to a waistband belt, thereby positioning the telephone close to the waistline of the user. Wearing the telephone close to the waistline, however, often limits the mobility of the user and causes discomfort, especially when sitting or squatting. Additionally, exposure of the telephone at the waistline creates the chance of the telephone being dislodged from the holster.

Some holsters are attached to a waistband belt by threading the belt's end through a fixed, non-releasable loop on the holster. This is a secure arrangement, but these fixed loop-type holsters have a drawback in that they require the waistband belt to be buckled and unbuckled to detach the holster. Examples of these include the holsters shown in U.S. Pat. No. 5,443,192 issued to Hodges in 1995 and U.S. Pat. No. 5,511,704 issued to Linderer in 1996. Such fixed loop-type holsters cannot be attached to items having the types of straps, belts or handles without a buckle or other opening. Some purse straps and handles are so constructed; they have both ends fixedly attached to the purse's body, thus preventing attachment of a fixed loop-type holster. Briefcase handles, although otherwise a convenient place from which to suspend a telephone holster, normally have their ends fixed to the case. Belt guide loops on trousers, interior door handles in vehicles, and many other fixed objects from which it might be convenient to suspend a cellular telephone holster cannot be used for that purpose if the holster's attachment loop is fixed and unable to be opened.

Other holsters employ various rigid, resilient slide clips to permit attachment of the holster to a fixed object. These are normally fashioned from a piece of spring steel folded to define two separate leaves. One leaf is attached to the telephone-engaging portion of the holster, and the other leaf has its free edge bent slightly outward to permit the clip to receive the edge of a belt or other object from which the holster is to be suspended. Examples of such slide clip-type holsters are shown in U.S. Design Pat. No. 203,101 issued to Hunter in 1965; U.S. Design Pat. No. 280,863 issued to Leath in 1985; U.S. Design Pat. No. 316,999 issued to Sarff in 1991; and, U.S. Pat. No. 4,757,927 issued to Rutty in 1988. Such slide clip-type holsters are convenient in that they can be easily clipped to, and unclipped from, a waistband belt without undoing its buckle. And, they can be engaged with objects having fixed ends, such as purse straps and belt guide loops on trousers. However, slide clip-type holsters have several drawbacks, as well. One is that they can be easily dislodged from a waistband belt, such as when the user is sitting or squatting. And, they can be easily disengaged from a purse strap during normal use. Further, the size of the slide clip, and particularly the radius of the fold between its leaves, restricts the range of objects from which the holster can be suspended. For example, a slide clip with a small radius fold may be adapted to attach most securely to a waistband belt comprised of a single layer of leather. However, that same slide clip will not permit engagement of the holster with a briefcase handle or a vehicle door handle.

Yet another type of holster employs one or more flexible straps fitted with engagement means such as snaps, or hook and loop fabric fasteners such as are sold under the trademark Velcro. The straps on holsters of this type are adapted to encircle a fixed object of any shape or thickness, such as a waistband belt, a purse strap, or a vehicle's interior door handle. Once around the fixed object, these straps can be bound securely in place; and, they can be disengaged from the fixed object just as easily. Examples of such flexible strap-type holsters are shown in U.S. Pat. No. 5,174,483 issued to Moore, IV et al. in 1992; U.S. Design Pat. No. 297,683 issued to Beauchan in 1988; and, U.S. Pat. No. 4,572,415 issued to Fehr in 1986. Such holster attachment mechanisms solve some problems of the fixed loop-type and slide clip-type holsters discussed farther above. However, they still have several drawbacks. One is that although the attachment straps of these open strap-type holsters can encircle fixed objects of different sizes and shapes, many, such as those in the Beauchan and Moore, IV et al. patents, have little adjustability in the circumferences of their straps. This causes them to hang very loosely around fixed objects of minimal girth, and makes it more likely that they will catch on passing objects. Further, the opposed strap portions of open strap-type holster fasteners can be difficult to engage with one another in certain circumstances, such as when the user is attempting to fasten the holster to a waistband belt while wearing the belt about the waist on trousers. In that case, the straps of a holster such as that in the Fehr patent, which mate with one another on the opposite or inner side of the waistband belt, would be difficult to draw tight around the belt. Common experience makes it easily understood that it would be difficult to insert one's fingers between a waistband belt and the waistband of a pair of trousers to fasten overlapping hook and loop fabric-faced straps to one another, while the waistband belt remains buckled around one's waist in normal use.

Further, those holsters, such as in the Fehr, Beauchan and Moore, IV, et al patents, which employ hook and loop fabric fasteners for engagement of straps to fixed objects are somewhat difficult to use, because they do not permit easy fine adjustment of the attachment straps' tightness. Once the mating fabric patches touch one another, they start to bind. After the initial touching, it is difficult to slide the fabric patches laterally with respect to one another to adjust the straps' tightness. Another drawback is that attachment straps of this type are difficult to cinch tight around an object. First, there is nothing to pull against to get good purchase to achieve a cinching action; and, second, once cinched, there is no easy means provided for temporarily binding the straps in place while the hook and loop fasteners are being engaged.

In addition to the above-noted drawbacks of the forgoing holsters, once removed from a waistband belt, purse handle, or the like, no provision is made to keep the holster in a handy location for ease of later reattachment.

Yet further, holsters in current use such as those above frequently employ unreliable mechanisms for engaging the instrument. Most simply wrap around the instrument, thus permitting it to be fairly easily inadvertently dislodged. Such wrap-around holsters make the instruments easy targets for thieves, as well. Yet holsters which employ covers and other closures for better security can also make it difficult to remove the instrument for use, and to replace it afterward. And, if such a cover or closure is inadvertently left unfastened, the unsecured instrument can be easily lost or stolen. A further problem with all holsters of the wrap-around and cover or closure-types is that they usually obscure or obstruct some functional portion of the instrument. This is inconvenient, because such holsters require the removal of the instrument from the holster for use.

Thus, it appears that a need exists for an instrument holster which is able to be easily and securely attached to a variety of fixed objects of different shapes and sizes. And, it would be of particular advantage if such holster were as easy to attach to a belt, strap or handle not having a releasable buckle or fastener, as to a belt, strap or handle having a buckle or fastener. Further, it would be beneficial if such holster's attachment means were able to be easily cinched tight to a fixed object. Yet further, it would be advantageous if such holster were to have a fixed object attachment mechanism, preferably employing hook and loop fabric fasteners, which allowed for unimpeded fine adjustment of the position of the mating portions of the mechanism with respect to one another before engagement with the fixed object.

Other benefits would result if the instrument attachment portion of the holster were able to retain the instrument securely against loss or theft, while not obscuring or obstructing its functional portions and permitting easy removal by the rightful user. And, once removed from a fixed object such as a waistband belt or purse strap, some means for keeping the holster in a handy location for later reattachment, and for permitting easy use of the instrument in the interim, would be beneficial.

SUMMARY OF THE INVENTION

The instrument holster and kit of the present invention are adapted to overcome the above-noted shortcomings and to fulfill the stated needs. The holster comprises a body; a cinching loop which projects from the body and divides the body into first and second portions; a cinching strap projecting from the first portion of the body; means for releasably binding the cinching strap to the second portion of said body; and, means for securing an instrument to the body.

The kit of the invention further includes means for selectively affixing said cinching strap securely to, and for releasing said strap from, a generally planar surface.

It is an object of the present invention to provide an instrument holster which is able to be securely attached around belts and other fixed objects of various shapes and sizes.

Another object of this invention is to provide an instrument holster which is able to be attached to a fixed object not having a releasable fastener in its length.

Yet another object of this invention is to provide an instrument holster which is able to be attached to a waistband belt without the necessity of releasing the waistband belt's fastener.

It is a further object of the present invention to provide an instrument holster which is able to be cinched tight to a fixed object.

Yet a further object of the present invention is to provide a precisely-adjustable mechanism for attaching an instrument holster to a fixed object.

Still a further object of the present invention is to provide an instrument holster which is able to retain an instrument securely without obstructing its function.

Another object of the present invention is to provide an instrument holster wherein the user is able to detach the instrument with ease, yet protection is provided against inadvertent or unauthorized detachment.

A further object of the invention is to provide an instrument holster attachment mechanism able to be cinched around a fixed object, and also able to be suspended from a generally planar surface.

And it is also an object of the present invention to provide a superior mechanism for cinching a strap around a fixed object.

Still further objects of the inventive instrument holder and kit disclosed herein will be apparent from the drawings and following detailed description thereof.

DESCRIPTION OF THE PREFERRED EMBODIMENT

Figure 1:
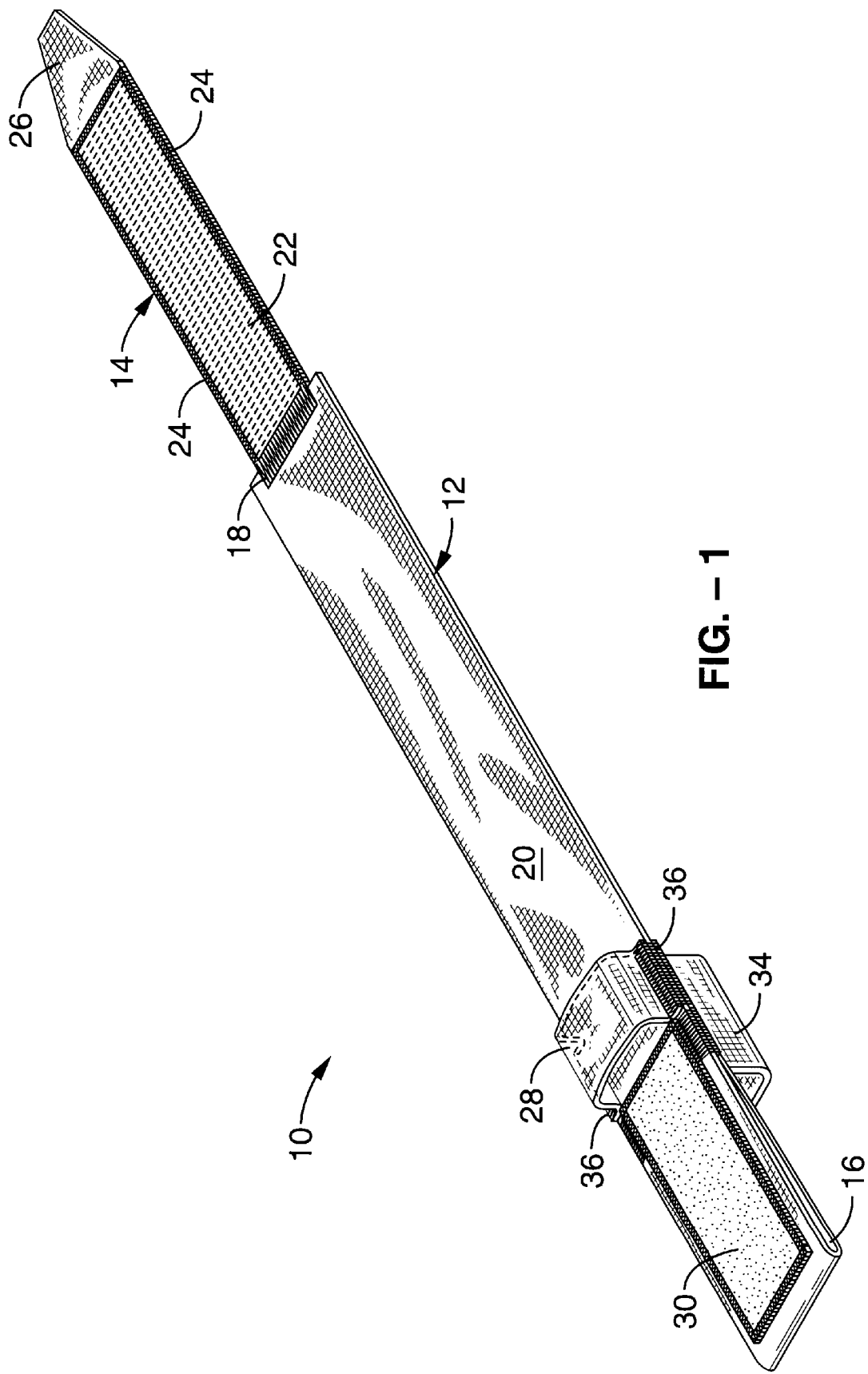
FIG. 1 is a perspective view of the holster of the invention in its fully extended posture.
Figure 2:
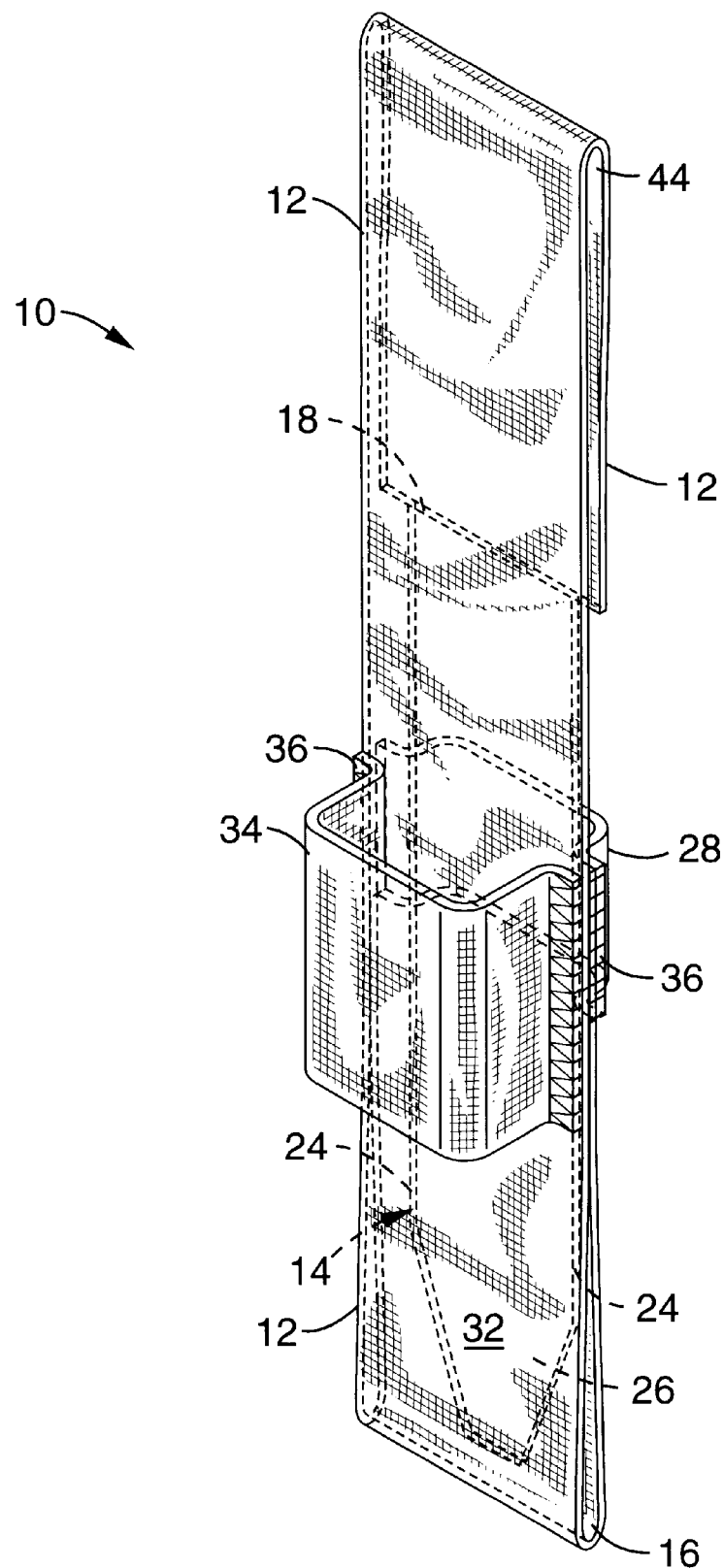
FIG. 2 is a perspective view of the holster of the present invention, with the holster configured as when cinched to an object.

Referring now specifically to the drawings, FIGS. 1 and 2 show the inventive instrument holster, which is generally identified herein with the reference numeral 10. Holster 10's primary body member 12 is an elongate, generally rectangular, flexible strip of nylon webbing. One end of primary body member 12 has a thinner, more flexible, slightly narrower strip of nylon webbing projecting axially therefrom, this being identified herein as cinching strap 14. The other end of primary body member 12 is folded back and sewed to itself to form finger loop 16. Approximately one-third, or so, of primary body member 12's overall length is doubled in the formation of finger loop 16.

Cinching strap 14 is bound to the end edge of primary body member 12 with a transverse row of conventional stitches 18. One face of cinching strap 14, i.e. the "cinching face" 20 shown in FIG. 1, bears a patch of hook pile-type mating fabric 22 which substantially covers the entirety of cinching strap 14. Mating fabric of the type sold under the trademark VELCRO has been found to work satisfactorily.

Zigzag-stitched parallel side seams 24 bind hook pile patch 22 to cinching strap 14. Side seams 24 are preferably comprised of very closely-spaced stitches built up to a thickness greater than that of the combined thickness of the webbing material of cinching strap 14 and hook pile-type mating fabric patch 22. Further, the thread used in cinching strap side seams 24 is preferably a synthetic composition having a slippery surface texture, i.e. a low coefficient of friction. Monofilament thread has been found to work best for the intended purpose, which is described fully below. Conventional stitches of any type known in the art to be satisfactory may be used to bind the end edges (unnumbered) of hook pile patch 22 in place.

The terminal end of cinching strap 14 is beveled and is not covered with any type of mating fabric, thus forming terminal tab 26.

Cinching loop 28 is comprised of a flexible piece of nylon webbing sewed to opposed side edges of primary body member 12. Cinching loop 28 is disposed at approximately the same point on primary body member 12 where the double-layered finger loop 16 portion diverges from the single-layered portion. That is, about one-third of primary body member 12's length lies to the finger loop 16 side, and two-thirds lies to the side of primary body member 12 to which cinching strap 14 is attached.

Cinching loop 28 should be cut from a strip of webbing stock somewhat narrower than the width of either primary body member 12 or cinching strap 14. Further, the longitudinal axis of the fabric of cinching loop 28, as established from the elongate strip of nylon webbing stock from which it was originally cut, should be oriented so that the fabric of cinching loop 28 is transverse to the longitudinal orientation of the fabric of primary body member 12. The transverse length of cinching loop 28, before being sewed in place, is approximately 1.5 times the width of the webbing strip used for primary body member 12. As shown in the drawing figures, cinching loop 28 preferably stands up generally rectangularly from the surface of cinching face 20 of primary body member 12. Thus, a clear, unimpeded passage is provided beneath cinching loop 28. Cinching loop 34 should be of sufficient dimensions to permit passage therethrough of cinching strap 14.

Cinching face 20 also includes a patch of loop pile-type mating fabric 30 which substantially covers the entirety of the doubled finger loop 16 portion of primary body member 12. Conventional stitches of any type known in the art to be satisfactory may be used to bind the side and end edges (unnumbered) of loop pile patch 30 in place. Looped fabric complementary to and suitable for binding securely to hook pile patch 22 is required. Fabric of the type sold under the trademark VELCRO has been found to work satisfactorily.

The opposed "instrument bearing face" 32 of holster 10 includes transversely-oriented, instrument attachment loop 34. Instrument attachment loop 34 is preferably somewhat longer in axial length than cinching loop 28, although like loop 28 the piece of stock used in its construction is approximately 1.5 times the width of primary body member 12. Cinching loop 28 preferably stands up generally rectangularly from the surface of cinching face 20 of primary body member 12. Thus, a clear, unimpeded passage is provided beneath instrument attachment loop 34. Instrument attachment loop 34 should be of sufficient dimensions to permit passage therethrough of a slidingly-engageable spring clip of the type commonly found to project from portable telephones and other such instruments.

That face of finger loop 16 which is part of instrument bearing face 32 does not include any mating fabric; only that face of finger loop 16 which is part of cinching face 20 includes mating fabric, namely loop pile patch 30.

Loop attachment seams 36 along the sides of primary body member 12 adjacent cinching loop 28 and instrument attachment 34 bind these loops securely to primary body member 12. Loop attachment seams 36 are equal in axial length, that axial length being at least the axial length of the longer of the two loops, instrument attachment loop 34. Loop attachment seams 36 also serve to bind the free end of the strip of webbing of primary body member 12 back upon itself to form finger loop 16. An additional transverse seam (not shown) to bind that free end to primary body member 12 may also be used, if desired.

Figure 6:
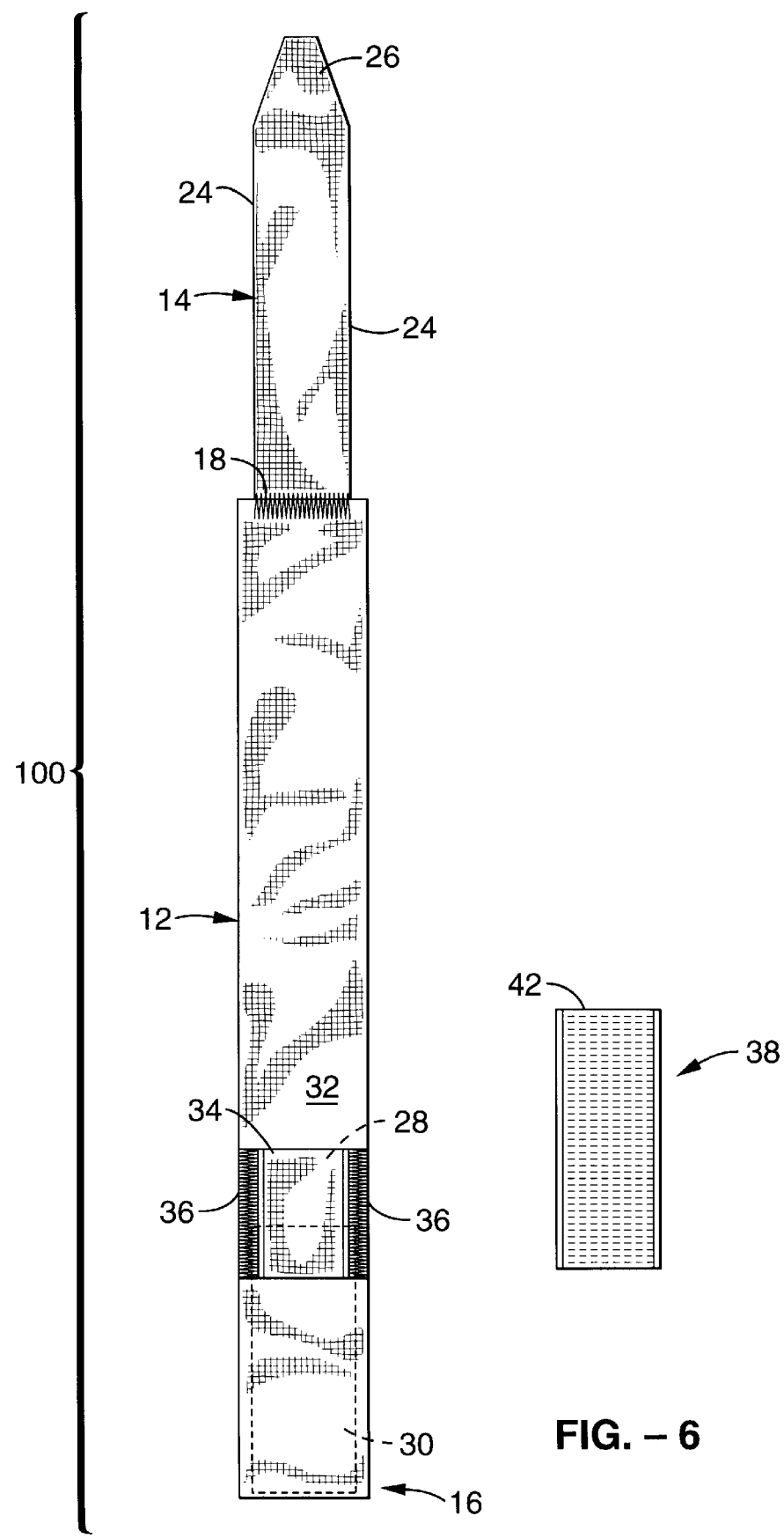
FIG. 6 is a plan view of one side of the kit of the invention, showing the instrument bearing face of the holster.
Figure 7:
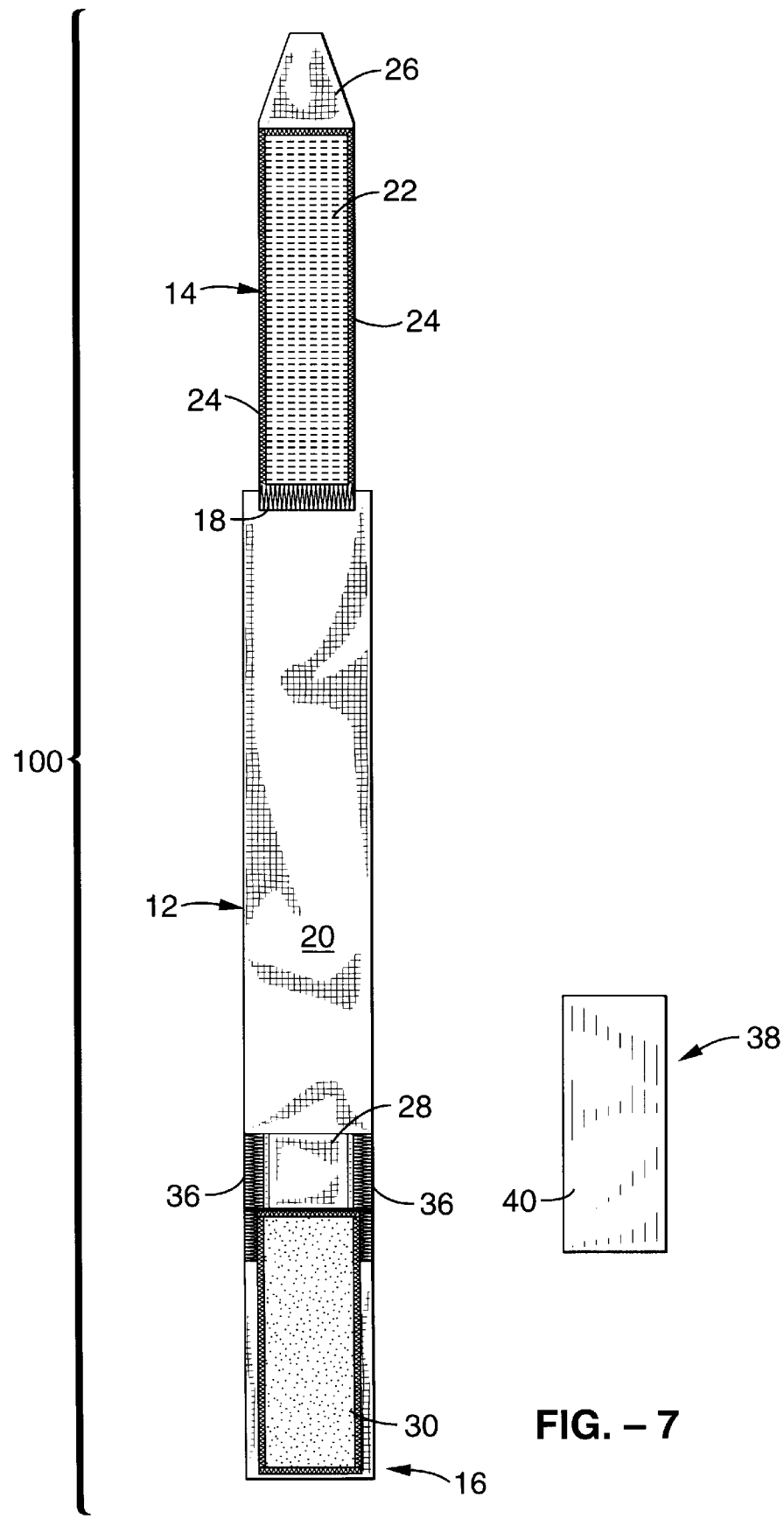
FIG. 7 is a plan view of the kit of the invention opposite to the side depicted in FIG. 6, showing the cinching face of the holster.

The kit of the invention, identified by reference numeral 100 herein and depicted in FIGS. 6 and 7, includes the aforedescribed holster, and also includes an auxiliary adhesive-backed patch of loop pile-type mating fabric 38. Auxiliary mating fabric patch 38 should be adapted for mounting on a generally planar surface. The adhesive back 40 of auxiliary mating fabric patch 38 may be of the peel-off, pressure-applied type, or it may be of a type which must be either wetted or treated with a catalyst before application to a surface. It should also be understood that the fabric of auxiliary mating fabric patch 38 may be of the loop pile-type 42 as shown, or of the alternative complementary hook pile type, if necessary to carry out one or more below-described uses of holster 10.

Figure 3:
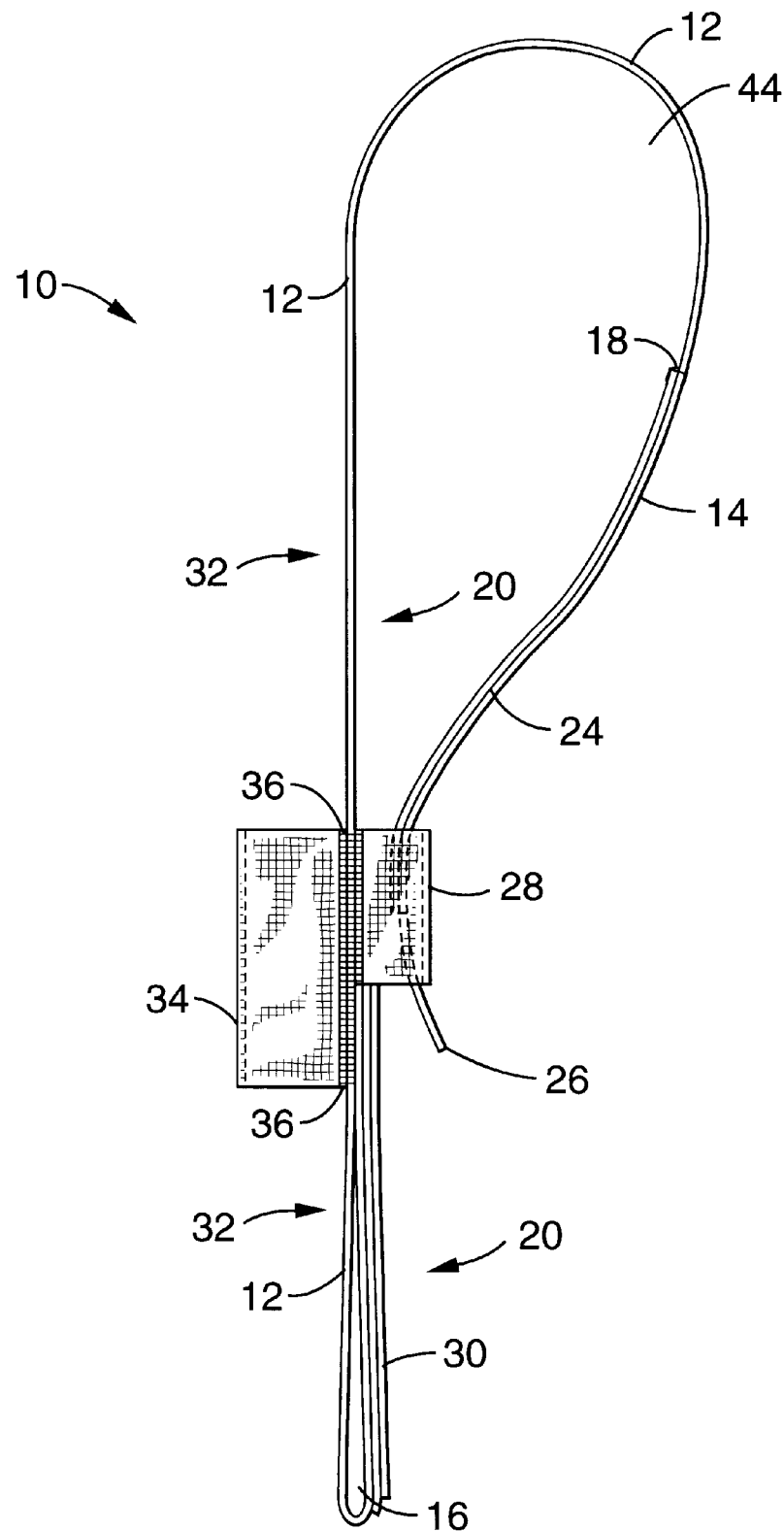
FIG. 3 is a side elevation view of the holster of the invention, showing the cinching strap end being inserted through the cinching loop.
Figure 4:
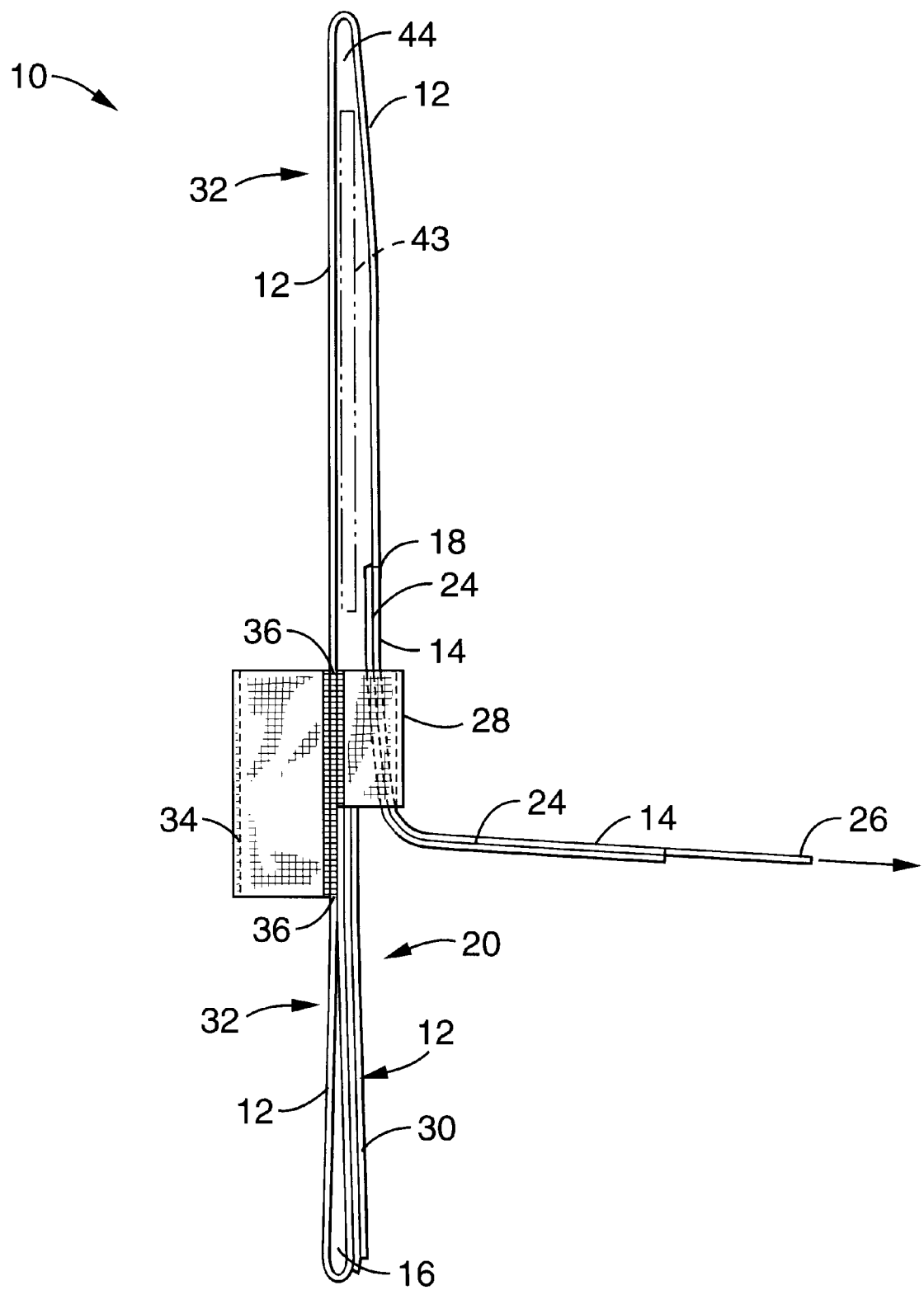
FIG. 4 is a side elevation view of the holster of the invention, showing the cinching strap end pulled through the cinching loop and drawn perpendicularly away from the holster's body, as when cinching the holster to an object.

In use, cinching strap 14 is first wrapped around an object, such as a waistband belt 43, or other fixed object. The object can be of nearly any cross-sectional shape. Terminal tab 26 of cinching strap 14 is then threaded through cinching loop 28 as shown in FIG. 3. This forms object engaging loop 44, through which the waistband belt or other fixed object passes. Next, as shown in FIG. 4, terminal tab 26 of cinching strap 14 is drawn in a generally perpendicular direction, away from the plane of primary body member 12. As cinching strap 14 is drawn in the direction described, cinching strap 14 constricts tightly around the fixed object, conforming to its cross-sectional shape. Snug engagement of cinching strap 14 about the object is best achieved if cinching strap 14 is drawn away from the plane of primary body member 12 with more than minimal force. In attaching holster 10 to one's own waistband belt 43, for example, the best purchase of cinching strap 14 about belt 43 may be gained by inverting holster 10 and drawing terminal tab 26 in a direction perpendicular to the generally vertical plane surface of one's body.

Once pulled snug about the object, cinching strap 14 is held tightly cinched and prevented from back-slipping by pressing the thumb against the flat, outer surface of cinching loop 28 in a direction perpendicular to, and toward the plane of, primary body member 12. The described force of the thumb is best met with equal, opposing force of the forefinger against the flat, outer surface of instrument attachment loop 34. Of course, this collapses cinching loop 28 and instrument attachment loop 34 in opposite, opposed directions, toward the plane of primary body member 12. The afore-described dimensions and transverse orientation of the webbing fabric of cinching loop 28 permit it to collapse most symmetrically and with an even surface-to-surface contact against cinching strap 14. And, the orientation of the grain of the fabric of cinching loop 28 perpendicular to the grain of the fabric of cinching strap 14 increases the friction between the two with a given amount of finger pressure, thus making it easier to hold cinching strap 14 tightly cinched while the following step is being carried out.

Figure 5:
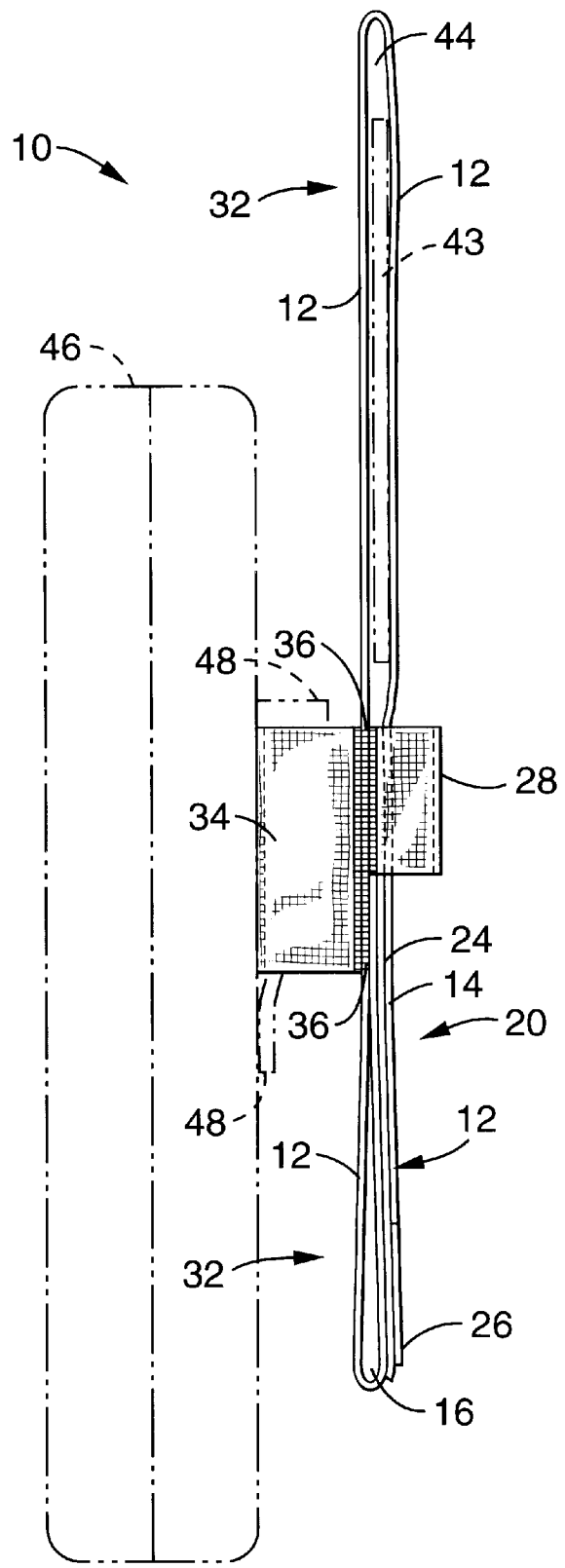
FIG. 5 is a side elevation of the inventive holster configured as in FIG. 2, with the cinching strap bound to the holster's body, showing a cellular telephone in phantom line engaged with the attachment loop on the instrument bearing face of the holster.

Once cinching strap 14 is held in its snug position as described, the opposed thumb and forefinger of the other hand may be pinched toward one another on opposed sides of holster 10 and run toward the finger loop 16 end of holster 10. This action brings the entire length of cinching strap 14 into contact with, and causes it to lie flat against, the cinching face 20 side of finger loop 16. This also causes hook pile-type fabric patch 22 to become engaged with mating, complementary loop pile-type fabric patch 30. This result is shown in FIG. 5.

Holster 10 may also be cinched loosely to a fixed object, but doing so may not yield all of the advantages able to be derived from holster 10's unique structure. In any case, once engaged with a fixed object, holster 10 normally depends vertically therefrom.

Once cinched to a fixed object such as waistband belt 43, a portable telephone 46 or other such instrument may be engaged with holster 10 by sliding the free end of its spring clip 48 through the passage defined between instrument attachment loop 34 and holster 10's instrument bearing face 32. Common experience makes it clear that lifting upward on telephone 46 will not dislodge it from holster 10 as would occur if telephone 46 were simply clipped directly to a waistband belt, because primary body member 12 is flexible and will simply move along with telephone 46. Nevertheless, telephone 46 is easy to remove, intentionally, from holster 10 with the user's two hands by simply pulling downward on finger loop 16 and simultaneously pulling upward on telephone 46 to disengage its spring clip 48 from instrument attachment loop 34.

Intentional removal of holster 10 from waistband belt 43 or another such object is most easily accomplished by, first, removing any instrument engaged therewith from instrument attachment loop 34. Next, cinching strap 14 is pulled away from, and disengaged with, loop pile patch 30, thus returning to a position generally as is depicted in FIG. 4. Then, with one's thumb covering that portion of loop pile patch 30 closest to cinching loop 28, cinching strap 14 may be freely withdrawn from cinching loop 28 without interfering, unintended engagement of hook pile fabric patch 22 and loop pile fabric patch 30.

The unique combination, placement and interaction of cinching strap 14, cinching loop 28 and loop pile patch 30 also make it difficult for mistaken or unauthorized removal of holster 10 from waistband belt 43. This is because, even if mating fabric patches 22 and 30 are disengaged from one another, cinching strap 14 is not easily withdrawn from cinching loop 28 without covering loop pile patch 30 with the thumb. Any attempt to withdraw cinching strap 14 without covering loop pile patch 30 will allow the hooked pile of patch 22 to become engaged with that portion of loop pile patch 30 closest to cinching loop 28, preventing cinching strap 14 from being completely withdrawn. It should be noted that to maximize this security function, the passage between cinching loop 28 and the face of primary body member 12 should be as small as possible, without interfering with the action of inserting cinching strap 14 through cinching loop 28 during the process of engaging holster 10 with a fixed object.

Figure 8:
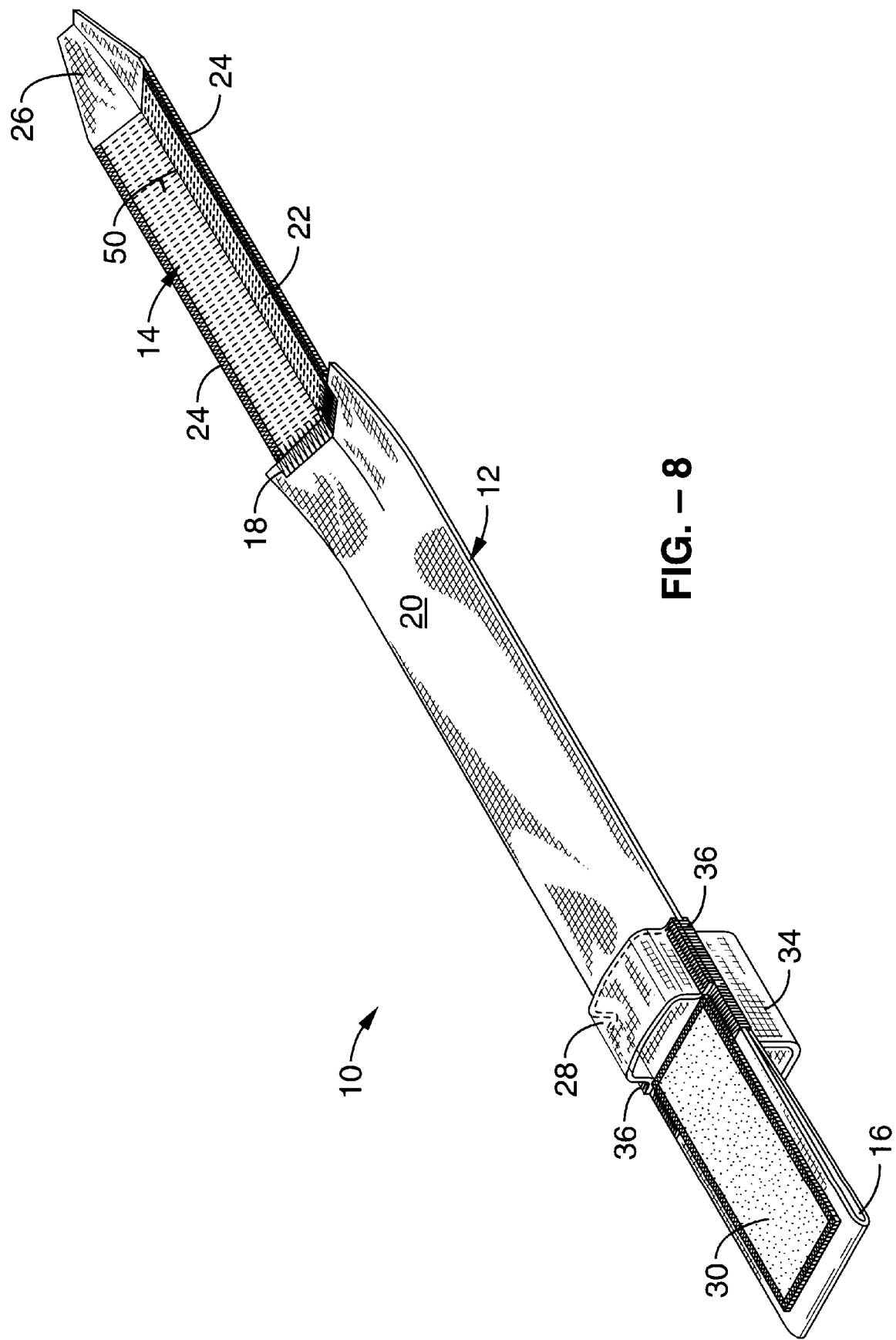
FIG. 8 is a perspective view of the holster showing longitudinal creasing of the cinching strap end in preparation for practicing an alternative method of inserting the cinching strap through the cinching loop.
Figure 9:
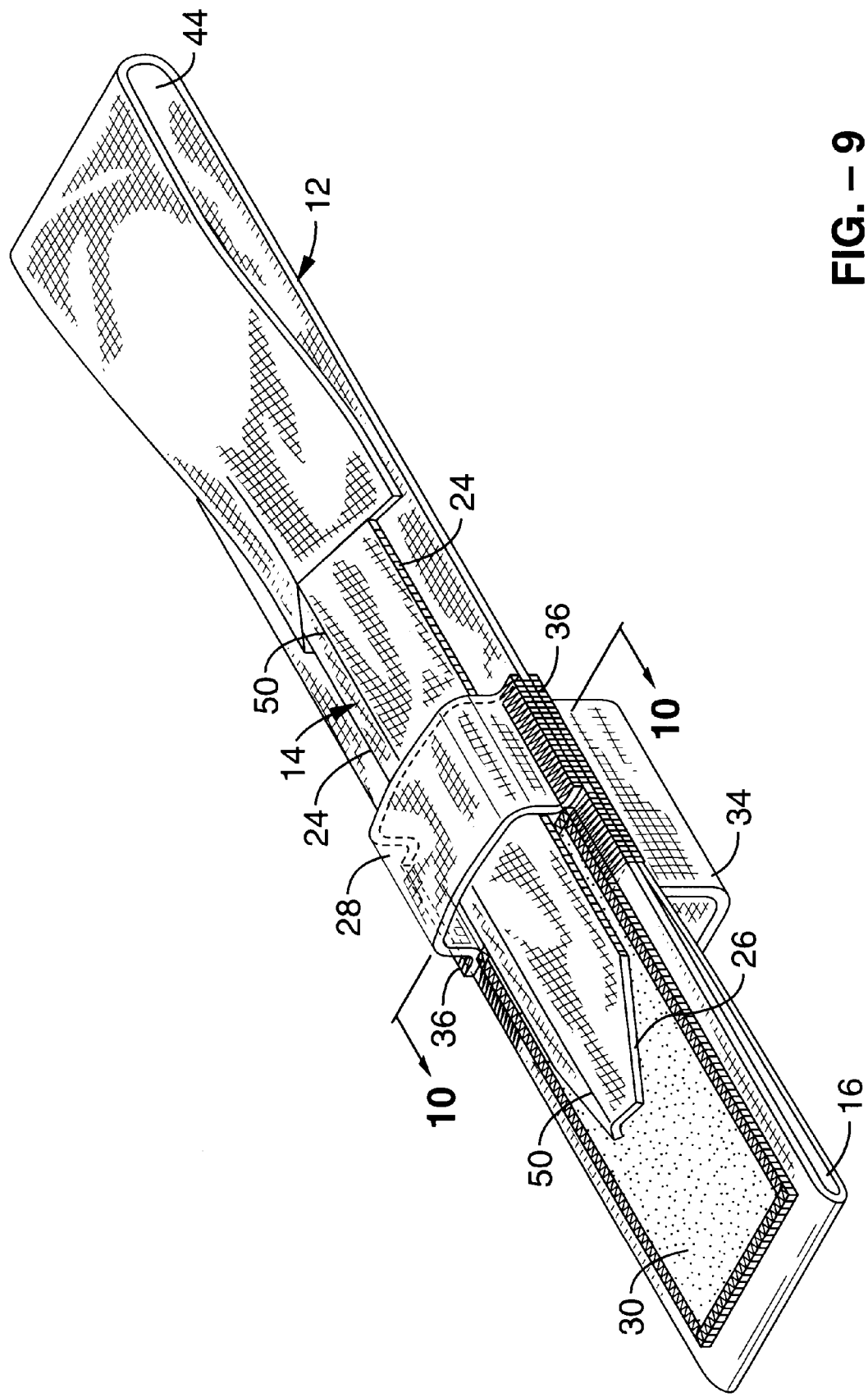
FIG. 9 is a perspective view of the holster showing the longitudinally-creased cinching strap end passing through the cinching loop.
Figure 11:
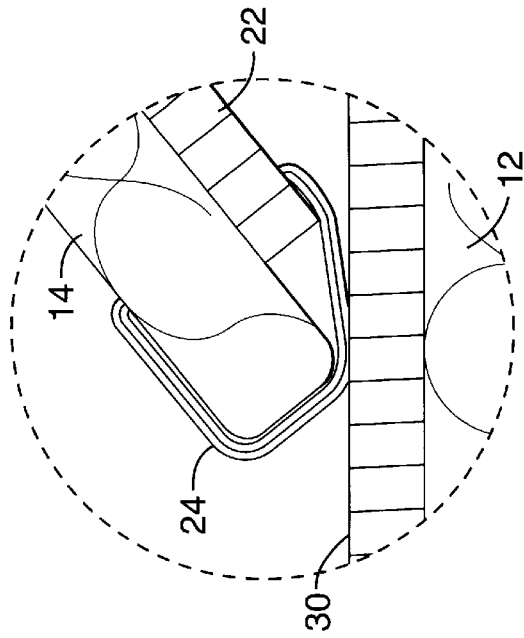
FIG. 11 is an enlarged detail of a portion of the cross-sectional view of FIG. 10, taken from the dashed circle in FIG. 10 identified "11," showing the side seams of the cinching strap.
Figure 10:
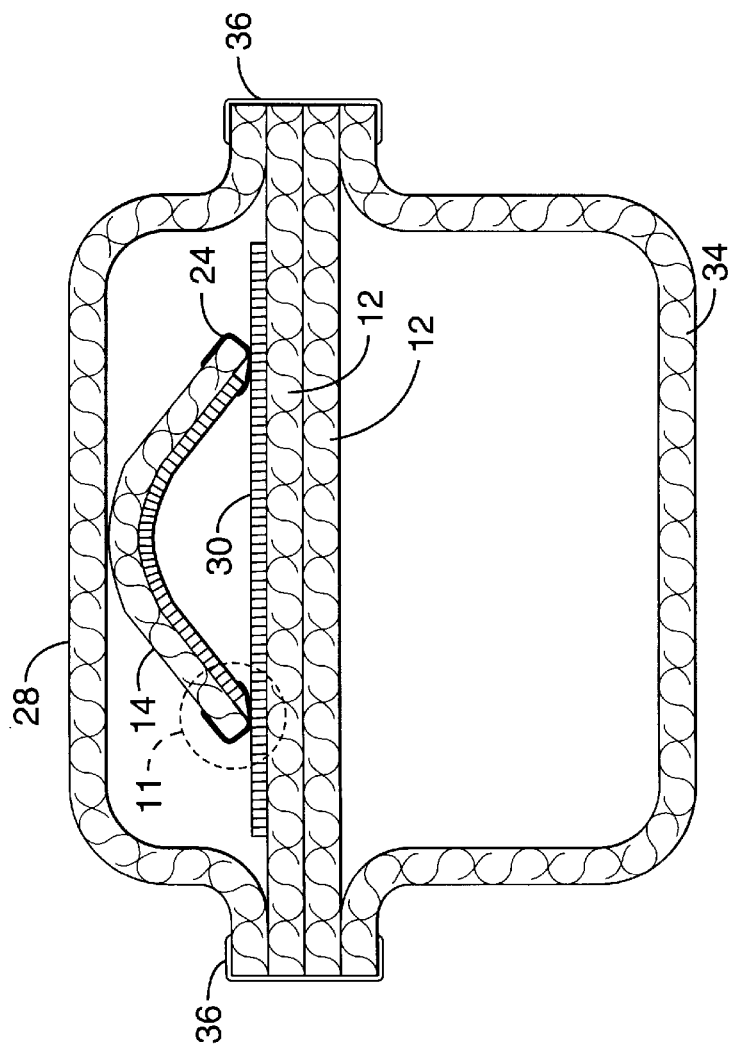
FIG. 10 is a cross-sectional view taken on lines 10—10 of FIG. 9.

One improved method of use of holster 10 permitted by the structure disclosed herein follows. In carrying out the procedure depicted in FIGS. 3 and 4, and as set forth in the text which refers thereto, it is possible for interfering, unintended engagement of hook pile fabric patch 22 and loop pile fabric patch 30 to occur. This can be avoided by creasing cinching strap 14 longitudinally, as shown in FIG. 8, before inserting it through cinching loop 28. Providing cinching strap 14 with hook pile-type mating fabric patch 22 rather than the alternative loop pile fabric permits a very well-defined crease 50 to form in cinching strap 14, and causes cinching strap 14 to become more rigid, as well. This is thought to be the result of the linearly-arranged rows of hooks in hook patch 22 which cause any fold made therebetween to be as straight as the arrangement of the hooks. Further, the hooks most closely adjacent to crease 50 seem to engage one another loosely, yet tangibly, thus tending to keep crease 50 in place. Yet further, the angled cross-section and double-layer construction of cinching strap 14, as best seen in FIGS. 10 and 11, tends to impart linear and lateral rigidity to cinching strap 14, thus making it easier to drive cinching strap 14 through the passage defined between cinching loop 28 and the face of primary body member 12. This operation is shown in FIGS. 9 and 10.

FIGS. 10 and 11 show that, when creased and driven through cinching loop 28, cinching strap 14 tends to glide axially on its low-friction, zig-zag stitched side seams 24. As depicted in FIG. 11, this permits the hooks and loops of hook pile patch 22 and loop pile patch 30, respectively, to remain remote from each other while the position of cinching strap 14 is being linearly adjusted. Once adjusted, mere finger pressure on the outer face of cinching strap 14 will cause hook pile patch 22 and loop pile patch 30 to engage securely with one another.

Kit 100, depicted in FIGS. 6 and 7, is used by, first, pressing the adhesive back 40 of auxiliary mating fabric patch 38 to a wall, dashboard, or other generally planar surface, thus adhering auxiliary patch 38 thereto. Then, when holster 10 is not in use cinched to waistband belt 43 or some other fixed object around which cinching strap 14 is able to be attached, holster 10 may be "parked" simply by engaging hook pile patch 22 of cinching loop 14 thereto. Thus, holster 10 then depends from auxiliary patch 38 ready to be disengaged therefrom for use as above described. Alternatively, holster 10 may be used to suspend cellular telephone 46 or another such instrument from instrument attachment loop 34. Such instrument is just as secure against mistaken disengagement from holster 10 by being lifted upward as when holster 10 is engaged with waistband belt 43 or some other fixed object which cinching strap 14 can surround. Yet, the instrument is just as easy to remove from holster 10, as well, simply by pulling downward on finger loop 16 and, simultaneously, pulling upward on the instrument.

The foregoing detailed disclosure of the inventive instrument holder 10 and kit 100 is considered as only illustrative of the preferred embodiment of, and not a limitation upon the scope of, the invention. Those skilled in the art will envision many other possible variations of the structure disclosed herein that nevertheless fall within the scope of the following claims. For example, the body of holster 10 could be of a single layer throughout; and, although it is preferred that holster 10's body be flexible, it could be rigid without departing from the spirit of the invention, and without avoiding the claims.

It is also contemplated that both the cinching loop and the instrument attachment loop could be disposed on the same face of a holster to meet various needs, and that to do so would not avoid the claims.

It is further contemplated that the cinching loop and/or instrument attachment loop could be constructed of rigid or semirigid materials. Even rigid rings may work satisfactorily for some purposes. Yet further, the inventive holster may be constructed with methods and materials which make the cinching and instrument attachment loops integral with the body of the holster. One-piece, molded constructions are also envisioned.

And, alternative uses for this inventive holster and kit may later be realized. Accordingly, the scope of the invention should be determined with reference to the appended claims, and not by the examples which have herein been given.

What is claimed is:

1. A holster for securing an instrument to an object, wherein the holster comprises:
   a. a body;
   b. a cinching loop projecting from said body and dividing said body into first and second portions;
   c. a cinching strap projecting from said first portion of said body;
   d. means for releasably binding said cinching strap to said second portion of said body;
   e. means for securing an instrument to said body; and
   f. wherein an end portion of said cinching strap includes means for permitting said end portion to be folded lengthwise and, when so folded, to be moved slidingly to and fro through said cinching loop.

2. The holster of claim 1, wherein said end portion of said cinching strap further includes means for permitting said end portion, after being folded lengthwise and slidingly moved through said cinching loop to a final desired position, to be flattened and in being so flattened to cause said cinching strap binding means to bind said cinching strap to said body.

3. The holster of claims 1, wherein said cinching strap binding means comprises a pair of mating, selectively engageable and releasable members engageable upon contact with one another, one member of said selectively engageable and releasable member pair being disposed upon said cinching strap and the other member of said pair being disposed upon said body.

4. The holster of claim 3, wherein said body-disposed member of said pair is positioned and dimensioned such that, when said cinching strap is through said cinching loop and when said members of said pair are disengaged, a user is able to cover said body-disposed member with a thumb, thereby preventing contact between said mating members, and thereby permitting withdrawal of said strap from said loop without said mating members becoming engaged with one another.

5. The holster of claim 1, wherein said cinching strap has thickened, low-friction, parallel side edges.

6. The holster of claim 5, wherein said cinching strap's thickened, low-friction side edges are comprised of high-density stitching with low-friction thread.

7. A holster for securing an instrument to an object, wherein the holster comprises:
   a. a body;
   b. a cinching loop projecting from said body and dividing said body into first and second portions;
   c. a cinching strap projecting from said first portion of said body;
   d. means for releasably binding said cinching strap to said second portion of said body;
   e. means for securing an instrument to said body; and
   f. wherein said body has a first face and a second face, said means for securing an instrument being disposed upon said first face of said body and said cinching loop being disposed upon said second face of said body.

8. A holster for securing an instrument to an object, wherein the holster comprises:
   a. a body;
   b. a cinching loop projecting from said body and dividing said body into first and second portions;
   c. a cinching strap projecting from said first portion of said body;
   d. means for releasably binding said cinching strap to said second portion of said body;
   e. means for securing an instrument to said body; and
   f. wherein said means for securing an instrument comprises an attachment loop.

9. The holster of claim 8, wherein said attachment loop is comprised of flexible fabric.

10. The holster of claim 8, wherein said attachment loop is generally horizontal when said holster is affixed to and depends freely from an object.

11. The holster of claim 8, wherein said body has a first face and a second face, and wherein said attachment loop is disposed upon said first face of said body and said cinching loop is disposed upon said second face of said body.

12. The holster of claim 8, wherein said attachment loop projects from a mid-portion of said body, between said first and second body portions.

13. A holster for securing an instrument to an object, wherein the holster comprises:
   a. a body having first and second ends;
   b. a flexible cinching strap projecting from said first end of said body;
   c. a cinching loop projecting from a mid-portion of said body, said cinching loop being dimensioned to permit said cinching strap to be threaded therethrough;
   d. means for releasably binding said cinching strap to said body adjacent said second end of said body; and,
   e. means for securing an instrument to said body.

14. A holster for securing an instrument to an object, wherein the holster comprises:
   a. a body;
   b. a cinching loop projecting from said body and dividing said body into first and second portions;
   c. a cinching strap projecting from said first portion of said body;
   d. means for releasably binding said cinching strap to said second portion of said body;

e. means for securing an instrument to said body; and f. wherein said means for securing an instrument comprises an attachment loop oriented transverse to the length of said body.

15. The holster of claim 14, wherein said body has a first face and a second face, and wherein said attachment loop is disposed upon said first face of said body and said cinching loop is disposed upon said second face of said body.

16. The holster of claim 14, wherein said attachment loop projects from a mid-portion of said body.

17. A kit for securing an instrument, selectively, to a first type of object or to a second type of object, the first type of object having a generally linear, graspable member, the second type of object having a generally planar surface, the kit comprising:

a. a holster including means for engaging an instrument;

b. a strap projecting from said holster;

c. means for permitting said strap, once wrapped around a generally linear, graspable member, to be cinched tight around said generally linear, graspable member;

d. means for selectively affixing said strap securely to, and for releasing said strap from, said holster;

e. means for selectively affixing said strap securely to, and for releasing said strap from, a generally planar surface.

18. The holster of claim 17, wherein mating fabric of a first type is disposed on said strap, and wherein complementary mating fabric of a second type is disposed on said holster.

19. The holster of claim 18, further comprising:

i. a separate patch of said second type of mating fabric; and, ii. means for securely affixing said patch of said second type of mating fabric to a generally planar surface.

20. The holster of claim 17, wherein said holster comprises an elongate body with a transverse cinching loop dimensioned to permit an end of said strap to be threaded therethrough.

* * * * *